United States Patent Office 3,193,582
Patented July 6, 1965

3,193,582
LIQUID DIFFUSION SEPARATION PROCESS
Clark Edward Adams and William Floyd Arey, Jr., Baton Rouge, La., assignors to Esso Research and Engineering Company, a corporation of Delaware
No Drawing. Filed July 29, 1960, Ser. No. 46,092
11 Claims. (Cl. 260—593)

The present invention relates to a method for the separation and purification of liquids. More particularly, the present invention relates to a process for the separation of difficultly separable liquids by selective diffusion through a porous vitreous barrier.

The use of porous barrier material of fine size to separate both gases and liquids by diffusion is well known. Of particular interest is a barrier or packing of an etched, highly porous glass sold under the trade name "Porous Vycor." This glass exhibits an extremely high surface area of about $3 \times 10^6$ square centimeters per cc. of volume. Such a high surface area per unit of volume can exist only through the presence of a large number of interconnected pore spaces of capillary size. The glass is exceedingly strong, chemically resistant, and consists approximately of 96% $SiO_2$.

However, in using Porous Vycor as a membrane to separate components by liquid diffusion, it has been found difficult to separate close boiling components. Thus, normal nonane could not be separated significantly from n-decane by diffusion, while binary mixtures of components boiling further apart did not demonstrate too satisfactory separation characteristics.

It has been found that separation of binary mixtures by liquid diffusion through Porous Vycor can be substantially enhanced by the addition of a third component, miscible with both, which can be separated readily from the individual components or their mixtures by any convenient means, such as distillation, washing, extraction, and the like.

"Porous Vycor" is particularly suited for diffusion. Various shapes can be made from the alkali borosilicate glass starting material by conventional glass working techniques. The resulting material is then heated to allow a phase separation of the boria and silica and then the boria phase is extracted with acid. The resulting porous material has pores of relatively uniform diameter and structural stability. The high silica phase remaining is chemically inert to most materials and thus will not cause contamination or modification of products and is itself not subjected to change in properties. Other materials formed by compacting and/or sintering finely divided material such as glasses, chars, metals, magnesia, alumina and the like are also suitable for such diffusion operations but in general these materials are not as versatile as "Porous Vycor." Semipermeable membranes of collodion, rubbers, and other plastic-like materials, both synthetic and natural, have been used for separation of mixtures. The separations in these cases usually depend on molecular screening of large from small molecules or on selective solubility of one or more of the components. The pores in "Porous Vycor" are larger than molecular dimensions (10 to 100 A.) so the separations effected with liquid molecules must be by some phenomenon other than molecular screening which is not clearly understood at present. This separation may be due to an "adsorption diffusion" similar to surface diffusion observed with condensable materials in gaseous diffusion. Regardless of the mechanism, there is realized a marked improvement in the separation of a liquid mixture on passing through a porous barrier when there is added a third component which can subsequently be separated from the product streams by conventional processes.

This unusual separation of liquid components by diffusion through a porous barrier is carried out by introducing the liquid mixture to one side of the barrier with a pressure difference across the barrier. This pressure difference can be applied by reducing the pressure on the exterior of the barrier but preferably is obtained by applying the pressure to the liquid by means of a pump, by pressuring with an inert, insoluble and uncondensable (under conditions used) gas, or by hydrostatic head. Depending on which component is desired in greater purity (i.e., the less or more readily diffusible) and the relative amount of this component, conditions are maintained until the desired amount of material has diffused through the barrier. The rate of diffusion is directly proportional to the area of the barrier exposed and the applied pressure differential. Increased temperatures reduce the viscosity of the material and consequently increase the rate of diffusion. The material passing through the barrier is conducted to suitable collection or recovery equipment. The operation can be carried out in a continuous manner by slowly passing the mixture through tubes or across banks of the barrier and removing the undiffused product through a pressure controlling device at the opposite extremity from the inlet. In general, under such continuous conditions it is not desirable to have agitation or mixing of the undiffused material.

In accordance with the present invention there is added to the binary mixture to be separated 5 to 100%, preferably 10 to 50%, based on the feed mixture of a third component. It is desirable to use as small an amount of this third component as possible in order to minimize the amount of material required to be diffused and the amount of material necessary to recovery. In order to minimize the amount of material necessary to be diffused through the barrier the third component should preferably be a more difficulty diffusable material if possible. The preferred amount and nature of the third component will preferably be chosen after experimentation as the function of this material is not clearly understood at present. As noted in the following example, however, a broad range of materials may be used as the third component, either similar or dissimilar to the feed mixture. The third component should be miscible with the feed mixture and be readily separable from the product streams by conventional methods of separation such as distillation, washing, extraction, adsorption and the like.

Separations effected are expressed as alpha values which are defined as:

Alpha value ($\alpha$) =
$$\frac{\text{Mol percent of Component A preferentially diffused}}{\text{Mol percent of Component B preferentially retained}}$$
$$\frac{\text{Avg. percent A in solution}}{\text{Avg. percent B in solution}}$$

Experiments were carried out by placing 5 cc. of the equivolume mixture of the components in a 10 mm. tube of Porous Vycor sealed at one end and with 400 mm. Hg pressure of air at the open end. Approximately 50% of the liquid was allowed to diffuse through, and the "filtrate" and "residue" were analyzed by gas chromatography. In the table below the widespread applicability of this system is shown; thus not only may hydrocarbons be employed as additives to binary hydrocarbon mixtures, but oxygenated compounds as well. Similarly, hydrocarbons may be employed as additives in oxygenated binary mixtures.

*Table*

| | |
|---|---|
| I. n-Hexane/n-octane (56/44) | $\alpha=2.12$ |
| +n-Decane (48/32/20) | $\alpha=4.35$ |
| II. n-Heptane/n-octane (55/45) | $\alpha=1.33$ |
| +n-Pentane (31/27/42) | $\alpha=1.66$ |
| +Benzene (36/24/40) | $\alpha=1.55$ |
| +Acetone (46/25/29) | $\alpha=2.01$ |
| III. n-Octane/n-decane (59/41) | $\alpha=1.77$ |
| +n-Hexane (32/20/48) | $\alpha=2.80$ |
| IV. n-Nonane/n-decane (52/48) | $\alpha=1.02$ |
| +n-Hexane (31/26/43) | $\alpha=1.32$ |
| V. n-Hexane/benzene (47/53) | $\alpha=1.18$ |
| +Methanol (31/35/34) | $\alpha=3.46$ |
| VI. 2,2,4-trimethylpentane/n-octane (48/52) | $\alpha=(1.27)$ |
| +n-Pentane (36/28/36) | $\alpha=2.05$ |
| VII. Benzene/toluene (51/49) | $\alpha=1.89$ |
| +n-Hexane (41/30/29) | $\alpha=1.97$ |
| +Acetone (35/31/34) | $\alpha=2.02$ |
| VIII. Methanol/isopropanol (60/40) | $\alpha=1.57$ |
| +n-Hexane (46/28/26) | $\alpha=1.81$ |
| IX. Acetone/MEK (51/49) | $\alpha=1.77$ |
| +n-Hexane (39/31/30) | $\alpha=2.66$ |

These data clearly show that the additive greatly enhances the separation of the desired component from the binary mixture.

The present invention is applicable to separation of mixtures of organic liquids not readily separable by other means. It is particularly useful for sensitive organic compounds which cannot be separated by distillation due to degradation, etc.

What is claimed is:

1. An improved process for separating two closely boiling components of a liquid organic binary mixture by diffusion through a siliceous barrier of etched, highly porous glass having a surface area of about $3 \times 10^6$ cm.$^2$ per cc. of volume, each of said components being selected from the group consisting of paraffins, aromatics, alcohols and ketones; which process comprises adding from 5 to 100% of a third liquid component to said binary mixture, said third component being miscible with and readily separable from said two components in said binary mixture and selected from the group consisting of paraffins, aromatics, alcohols and ketones; subsequently passing the resulting three-component mixture through said siliceous barrier; and recovering a product mixture having an increased concentration of one of the components in said binary mixture.

2. The process of claim 1 wherein said third component is added in amounts of from 10 to 50%, based on said binary mixture.

3. The process of claim 1 wherein said binary mixture consists of paraffins and said third component is a paraffin.

4. The process of claim 1 wherein said binary mixture consists of paraffins and said third component is an aromatic.

5. The process of claim 1 wherein said binary mixture consists of paraffins and said third component is a ketone.

6. The process of claim 1 wherein said binary mixture consists of a paraffin and an aromatic and said third component is an alcohol.

7. The process of claim 1 wherein said binary mixture consists of aromatics and said third component is a paraffin.

8. The process of claim 1 wherein said binary mixture consists of aromatics and said third component is a ketone.

9. The process of claim 1 wherein said binary mixture consists of alcohols and said third component is a paraffin.

10. The process of claim 1 wherein said binary mixture consists of ketones and said third component is a paraffin.

11. An improved process for separating n-decane from a mixture of n-decane and a paraffin selected from the group consisting of n-octane and n-nonane by diffusion through a siliceous barrier of etched, highly porous glass having a surface area of about $3 \times 10^6$ cm.$^2$ per cc. of volume, which process comprises adding from 10 to 50% of n-hexane to said mixture; subsequently passing the resulting three-component mixture through said siliceous barrier; and recovering a product mixture having an increased concentration of n-decane.

References Cited by the Examiner

UNITED STATES PATENTS

| | | | |
|---|---|---|---|
| 2,924,630 | 2/60 | Fleck et al. | 210—23 X |
| 2,971,993 | 2/61 | Kimberlin et al. | 260—676 X |

OTHER REFERENCES

"Separation and Purification," Interscience Publishers, Inc., New York, 1956, vol. III, part I, pages 58–63.

ALPHONSO D. SULLIVAN, *Primary Examiner.*

CARL F. KRAFFT, CHARLES B. PARKER, LEON ZITVER, *Examiners.*